Dec. 16, 1958  G. A. BRACE  2,864,462
DISPOSABLE FILTER BAG FOR SUCTION CLEANERS
Filed May 7, 1954  5 Sheets-Sheet 1

Dec. 16, 1958 G. A. BRACE 2,864,462
DISPOSABLE FILTER BAG FOR SUCTION CLEANERS
Filed May 7, 1954 5 Sheets-Sheet 3

Dec. 16, 1958 G. A. BRACE 2,864,462
DISPOSABLE FILTER BAG FOR SUCTION CLEANERS
Filed May 7, 1954 5 Sheets-Sheet 4

Dec. 16, 1958 G. A. BRACE 2,864,462
DISPOSABLE FILTER BAG FOR SUCTION CLEANERS
Filed May 7, 1954 5 Sheets-Sheet 5

United States Patent Office 2,864,462
Patented Dec. 16, 1958

2,864,462

DISPOSABLE FILTER BAG FOR SUCTION CLEANERS

George A. Brace, San Carlos, Calif., assignor to The Hoover Company, North Canton, Ohio, a corporation of Ohio Application May 7, 1954, Serial No. 428,228

6 Claims. (Cl. 183—51)

The present invention relates to suction cleaners and more particularly to "throw-away" or discardable paper filter bags for suction cleaners including a combined mounting and valve attachable to the filter bag adjacent the inlet opening thereof.

Specifically, the invention relates to a "throw-away" paper filter bag, creased to be folded flat for storage or shipment and having a combined valve and mounting facility secured to its inlet opening.

Another object of the present invention is the provision of a combined mounting plate and valve adapted to be attached to a flat wall of a paper filter bag having inlet openings aligned with the inlet opening of the filter bag and in which the valve element closes the inlet opening to the filter bag automatically and as an incident to the removal of the filter from the cleaner.

Other objects and advantages of the present invention will become apparent as the description proceeds when taken in connection with the accompanying drawings in which.

Figure 1:
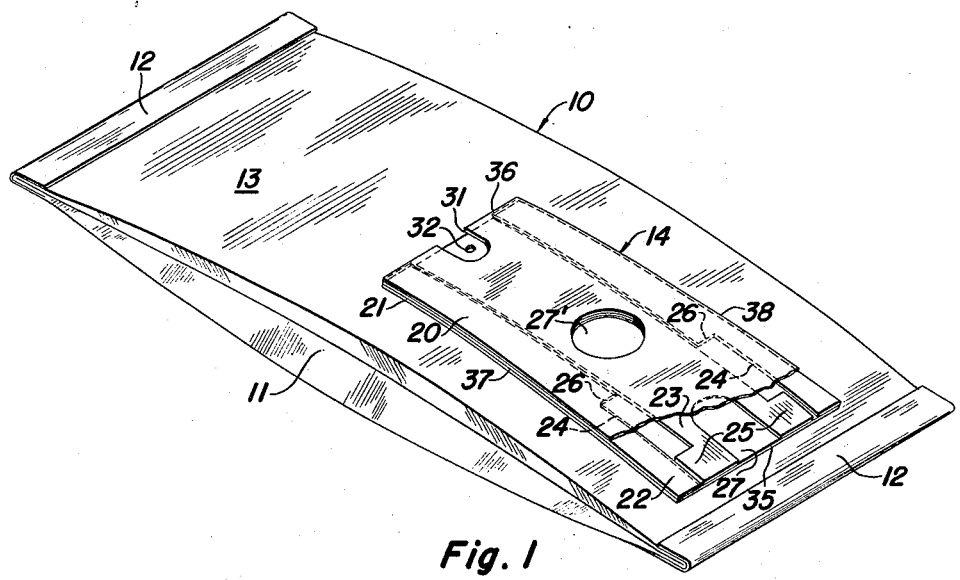
Fig. 1 is a perspective view of one form of bag showing one form of the combined mounting plate and valve of the present invention applied thereto.
Figure 2:
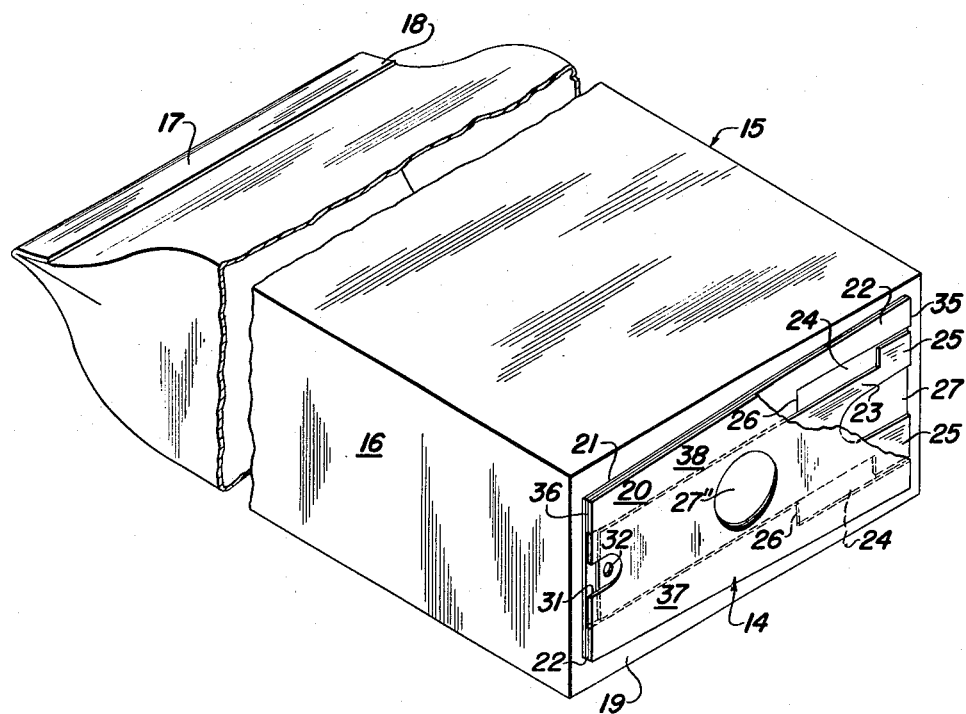
Fig. 2 is a perspective view of another form of bag showing the combined mounting plate and valve of Fig. 1 applied thereto.
Figure 3:
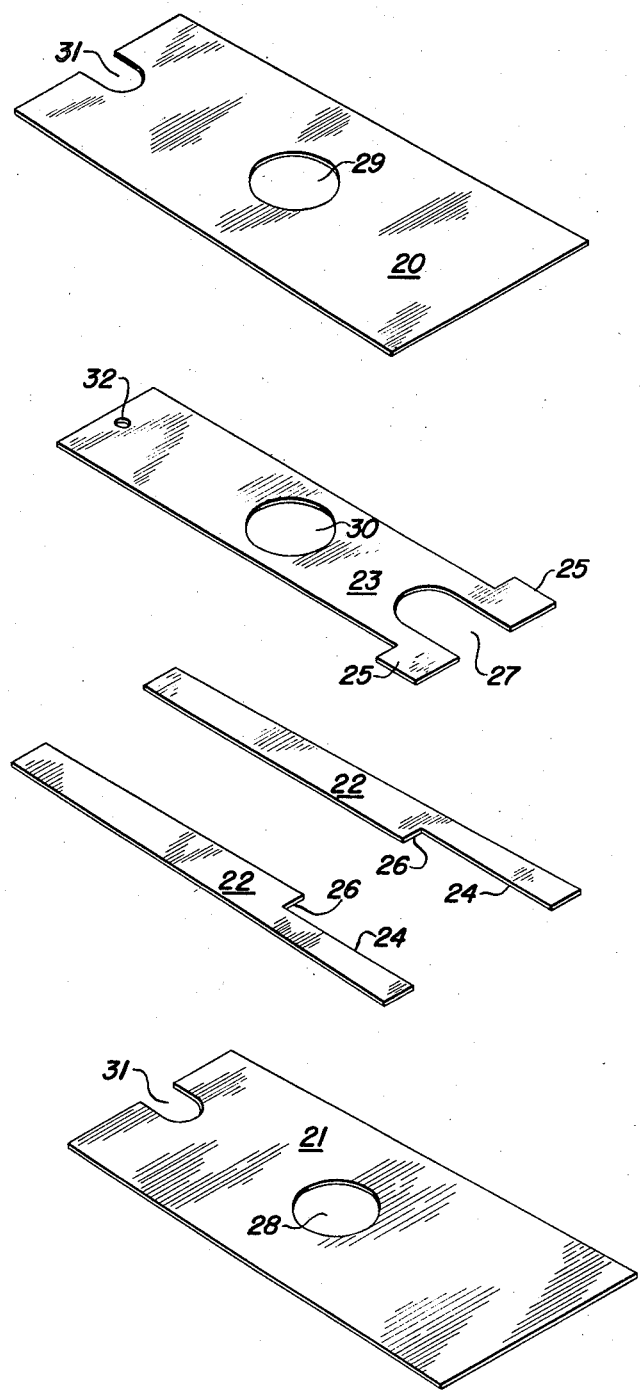
Fig. 3 is an exploded perspective view of the combined mounting plate and valve shown in Figs. 1 and 2.

Description of Figs. 1, 2 and 3

Referring to the drawings and especially to Fig. 1 thereof, the bag of the first modification is generally indicated by the reference numeral 10. The bag 10 is preferably made of filter paper for disposal when it becomes clogged with dust and dirt and is pleated along its opposite edges as shown at 11 so as to be readily expanded during use to form a large filtering area.

After pleating, the ends of the bag 10 are folded over at 12 and glued to close the ends of the bag 10, thus forming two flat sides, one of which is shown at 13.

The bag 10 may conveniently be made on a bag forming machine in a manner well known in the art, and is adapted to lie in a flat position so that a plurality of such bags may be packaged in a compact package for shipment or storage. The combined mounting plate and valve assembly generally indicated by the reference number 14 and to be later described is adapted to be attached in any suitable manner to the flat side 13 of bag 10. The bag 10 may be formed in the manner disclosed by Fig. 5 of my copending application Serial No. 402,719, filed January 7, 1954, now Patent No. 2,758,667.

The bag of Fig. 2, generally indicated by the reference number 15, is of the grocery sack type, and may be folded in the manner disclosed in my copending applications Serial Nos. 402,717 and 402,718, filed January 7, 1954, now Patent Nos. 2,755,883 and 2,758,668, respectively. The bag 15 is pleated along its lateral edges 16 as described in the aforementioned applications, its end 17 being closed by being folded over and glued as at 18 and being formed with a flat side 19 at its opposite end, to which the mounting plate and valve assembly 14 is suitably secured.

The assembly 14 of Figs. 1 and 2 comprises a mounting plate having upper and lower sheets of stiff paper 20 and 21, herein illustrated as separated at their edges by narrow strips 22 of stiff paper glued or otherwise secured to the sheets 20 and 21 so as to form a channel having parallel sides between the narrow strips 22 for slidably receiving a slidable valve element 23. Strips 22 need not be used and correspondingly shaped areas of the facing edges of sheets 20 and 21 may be glued or stapled together to define a guideway for valve 23.

The strips 22 are notched at 24 to receive wings 25 on valve member 23 which cooperate with shoulders 26 on strips 22 to limit the movement of the valve element 23.

The valve element 23 is notched at 27 whereby the sheets 20 and 21 may be grasped by the thumb and forefinger of the operator as the bag 10 or 15 is installed or removed without interfering with the movement of the valve element 23, as will be explained hereinafter.

The inlet opening for the bag 10 is generally indicated by the reference number 27' and that in the bag 15 by the reference numeral 27''. In forming the inlet openings, the sheets 20 and 21 are provided with aligned openings 28 and 29 for receiving dirt laden air and the valve element 23 is provided with an opening 30 adapted to be aligned with the openings 28 and 29 in the position shown in Figs. 1 and 2.

The sheets 20 and 21 are notched at 31 whereby the end of the valve element 23 may be manually grasped and the opening 30 moved out of alignment with the openings 28 and 29 to close the openings in the flat side of bag 10 or 15. The valve element 23 is also provided with an opening 32 whereby the valve may be automatically closed as will be described in connection with Fig. 9.

The end of the assembly 14 in which the notches 31 are formed is narrower than the other end, the purpose of which will be explained in connection with Fig. 9.

In both Figs. 1 and 2 the assembly 14 is anchored to the filter bag by gluing or otherwise attaching lower sheet 21 to the flat side 13 or 19 of bag 10 or 15 in a ring-shaped area immediately adjacent the inlet openings 27' and 27'', leaving the end 35 free to be grasped in applying the bags to a cleaner, leaving the end 36 free whereby the valve element 23 may be manually operated, and leaving the edges 37 and 38 free of the bag whereby those edges may be utilized in supporting the bag on a cleaner as will appear later.

The assembly 14 of Figs. 1 and 2 may be made and assembled in a number of different ways.

The sheets 20 and 21, being duplicates, may be blanked singly from a single roll of tape of the required width or simultaneously from two rolls of tape, it being noted that the openings 28—29, the notches 31 and the tapered formation of the sheets may be formed by a single blanking operation. The strips 22, being duplicates when one is placed on top of the other, may be blanked singly from a roll of tape or simultaneously from two rolls of tape. The valve element 23 may be blanked separately.

After the various sheets and strips are stamped, glue may be applied to the opposite sides of strips 22 and the sheets 20 and 21 applied thereto, the sheet 20 being applied on one side and the sheet 21 on the other so as to form the channel into which the valve element 23 may be inserted with the wings 25 thereof slidably mounted within the space formed by the notches 24. The lower sheet 21 may then be glued to the flat side 13 or 19 of bag 10 or 15 about the inlet openings 27' or 27", leaving the edges 37 and 38 free for mounting purposes, as will be explained hereinafter.

Figure 4:
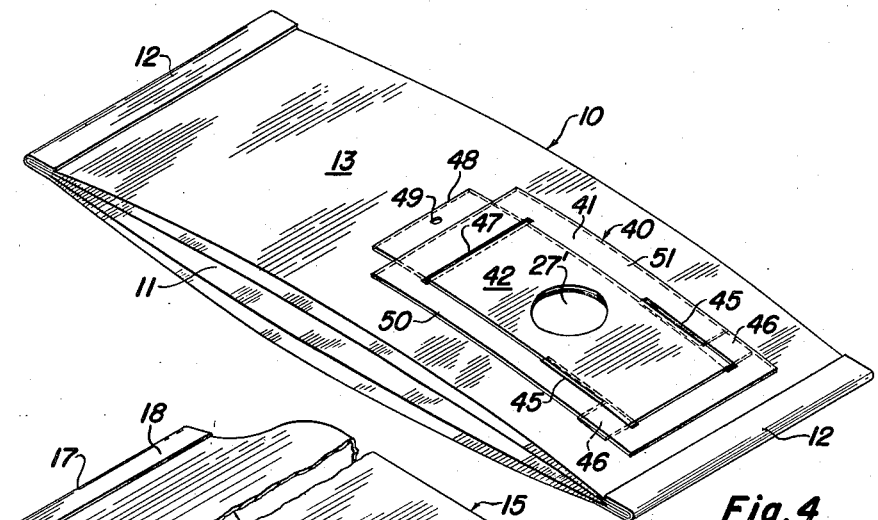
Fig. 4 is a perspective view of the bag of Fig. 1 showing another type of combined mounting plate and valve attached thereto.
Figure 5:
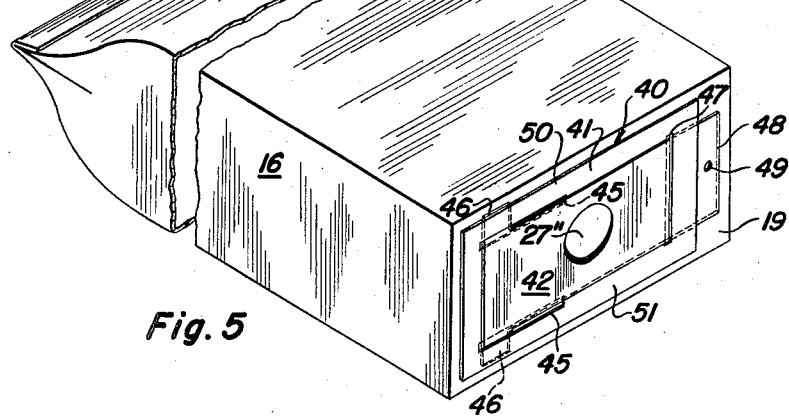
Fig. 5 is a perspective view of the bag of Fig. 2 showing the combined mounting plate and valve of Fig. 4 attached thereto.
Figure 6:
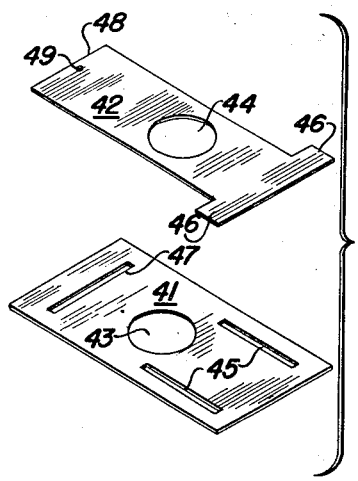
Fig. 6 is an exploded perspective view of the combined mounting plate and valve of Figs. 4 and 5.

*Description of Figs. 4, 5 and 6*

The modification of Figs. 4, 5 and 6 is the full equivalent of that of Figs. 1 and 2 in its general purpose but is of a much simpler construction. The bags 10 and 15 of Figs. 4 and 5 are duplicates of those shown in Figs. 1 and 2, respectively.

The combined mounting plate and valve assembly of this modification is generally designated by the reference number 40. The mounting plate comprises a single stiff sheet 41 glued or otherwise secured to the flat side 13 or 19 of bag 10 or 15 about the inlet opening 27' or 27" leaving its edges 50 and 51 and ends free of the bag. A comparatively light weight valve element 42 is adapted to be associated with the sheet 41 in a manner to be described. The sheet 41 is provided with an inlet opening 43 in alignment with either the opening 27' or 27" and the valve element 42 is provided with an opening 44 adapted to be aligned with the opening 43 or moved out of alignment therewith as will be explained.

The sheet 41 adjacent its free edges is provided with elongated longitudinal slots 45 and the valve element 42 is provided with wings 46 which are slidably received within the slots 45. The sheet 41 is also provided with a transverse slot 47 in its free end opposite that in which the slots 45 are formed through which the end 48 of the valve element 42 is extended in a manner to be described. The end 48 of valve element 42 is provided with an opening 49 for use in automatically closing the valve as will be explained.

The free side edges 50 and 51 of the sheet 41 are adapted for mounting the bag 10 or 15 in a suction cleaner as will be explained in connection with Figs. 7, 8, 9 and 10.

In fabricating the assembly 40 of Figs. 4 and 5, the strip 41 is blanked out with the long slots 45, with the inlet opening 43, and with the transverse slot 47. The valve element 42 is blanked so as to form the wings 46, the inlet opening 44 and the opening 49.

The end 48 of the valve element 42 is then inserted from above through the transverse slot 47 in sheet 41. The other end of the valve element 42 is transversely flexed and the wings 46 inserted into the slots 45 so as to take the position shown in Figs. 4 and 5. The sheet 41 may then be glued or otherwise secured to the flat surface 13 of bag 10 or to the flat surface 19 of bag 15 about the inlet openings thereof, leaving the ends and sides of the sheet 41 free of or unattached to the wall of the bag.

The opposite ends of the longitudinal slots 45 engage the wings 46 to limit movement of the valve element 42 when the latter is moved to open and closed positions relative to the bag inlets 27' or 27", and the elongated slots 45 and transverse slot 47 guide the valve 42 during such movement.

The valve and bag of the modifications of Figs. 1 and 4 may be attached to a suction cleaner in the manner shown and described in my copending application Serial No. 402,719, now Patent No. 2,758,667.

The valve and bag of the modifications of Figs. 2 and 5 are particularly adapted to be mounted in a tank type suction cleaner in the manner shown in Figs. 7, 8, 9 and 10, in which the reference numeral 60 represents the casing of the cleaner and 61 represents the runners on which the cleaner is supported when in use.

The casing 60 includes an end cap 62 having a suction opening fitting 63 into which a fitting 64, attached to a flexible hose, is inserted. The interior of the casing 60 is divided into a filter chamber 65 and a chamber 66 for housing a motor fan construction 67 mounted and arranged in a manner well-known in are art.

The end cap 62 includes a support for the filter bag including a pocket or channel 68 extending along two sides and across one end of end cap 62 for receiving the free edges of the filter mounting assemblies 14 or 40 of Figs. 2 and 5, respectively. Preferably, the opposite sides of the channels converge toward the far end so that the narrow end of the similarly shaped mounting plates 20, 21 or 41 must be inserted in the proper manner.

Extending downwardly along opposite interior walls of casing 60 is a pair of elongated housings or guideways 69 for receiving ejector rods 70, attached at their upper ends at 71 to the end cap 62 and biased upwardly by compression springs 72 reacting between the bottom 73 of housing 69 and washers 74 welded to the rods 70 intermediate their ends.

Figure 7:
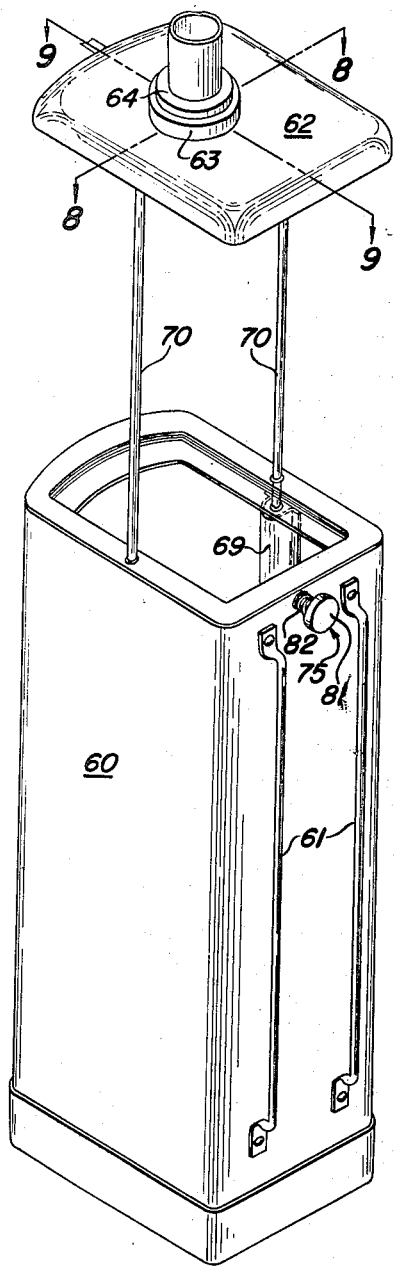
Fig. 7 is a perspective view of a suction cleaner to which the bags of Figs. 2 and 5 may be attached.
Figure 8:
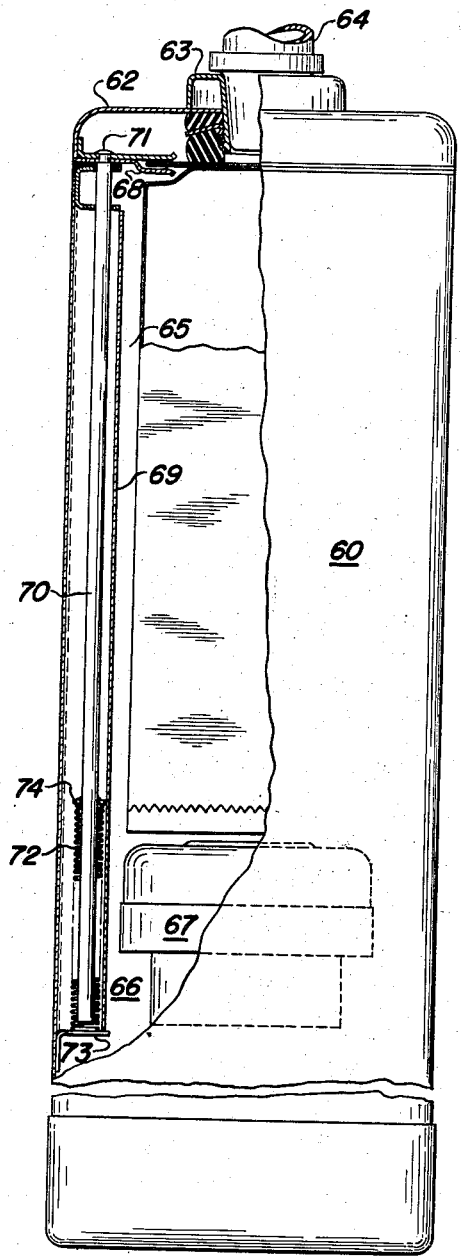
Fig. 8 is a sectional view of the cleaner of Fig. 7 taken on line 8—8 thereof and showing the end cap in closed position.

When released, springs 72 readily elevate the end cap and a dirt-filled filter to the position shown in Fig. 7. Normally, the end cap 62 it locked in its lowered position by a latch mechanism generally indicated by the reference numeral 75 and best illustrated in Fig. 9. The latch mechanism includes notches 76 formed near the upper ends of rods 70 in a position to be engaged by the hook-shaped detents 77 of arms 78 of a U-shaped member 79 which includes an extension 80 extending through the wall of casing 60. The U-shaped member 79 is normally biased toward its latching position by a spring 82 whereby the offset ends 77 of arms 78 are held in the notches 76 of rods 70 to hold the end cap 62 and its attached filter bag within the casing 60. A knob 81 is provided by which the latch may be released, as will be explained. Suitable guides are provided for the U-shaped member 79 to prevent movement thereof lengthwise of the cleaner body so that the end cap 62 will be effectively locked in closer position.

The ejector mechanism just described forms no part of the present invention. The disclosure is made herein to show one way in which the filter bag of the present invention may be supported.

Figure 9:
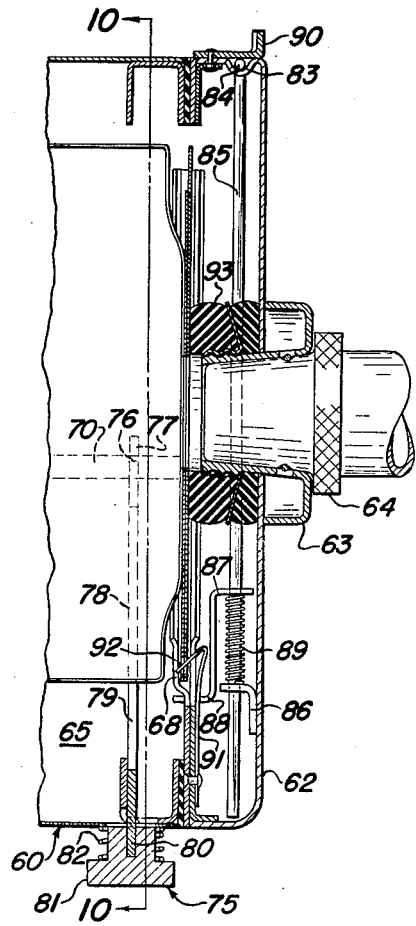
Fig. 9 is a sectional view taken on line 9—9 of Fig. 7 and showing the end cap in closed position.
Figure 10:
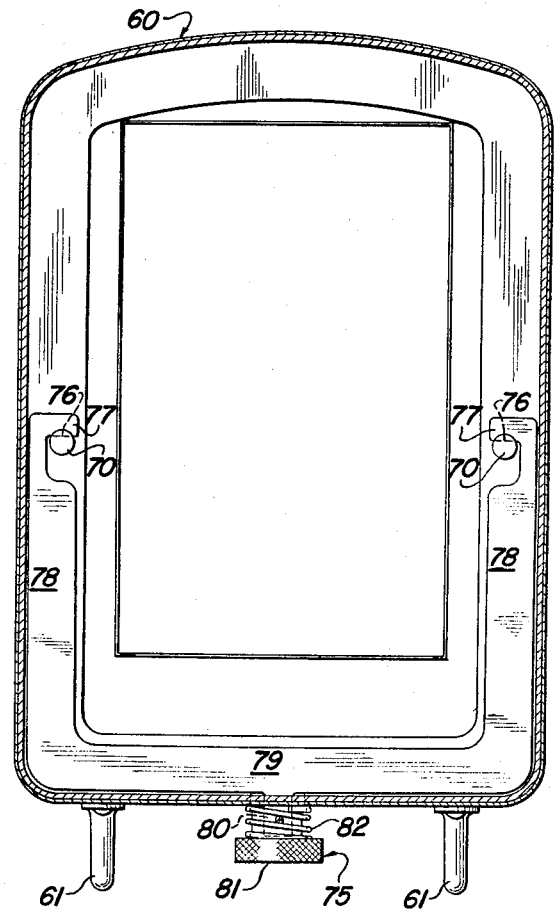
Fig. 10 is a sectional view taken on line 10—10 of Fig. 9.

The valves of the present invention may be manually closed as previously described but also may be automatically closed in the manner disclosed by Fig. 9.

One edge of the end cap 62 is grooved at 83 to receive the bight portion 84 of a U-shaped wire having legs 85 extending down through guides 86 attached to the lower portion of end cap 62. Brackets 87 are secured to the legs 85 above the guides 86. The brackets 87 have legs 88 which underlie the lower edge of the assemblies 14 or 40 and are spring biased upwardly by compression springs 89 compressed between brackets 87 and guides 86. The springs 89 are normally held compressed by a latch 90 which overlies the bight 84 of the U-shaped member.

With the end cap 62 and bag in elevated position as in Fig. 7, the latch 90 may be rotated 90° to release the bight 84 of the U-shaped member whereby the springs 89 will move the bag and valve member laterally from the end cap 62.

A leaf spring 91 is attached to the lower side of the end cap 62 and has a cammed end 92 so that as the bag 15 is originally assembled the cammed end 92 will engage the end of the valve element 23 or 42 to deflect the spring 91 whereby the end 92 of spring 91 will enter the opening 32 or 49 depending upon which valve is used.

When the bag is removed from the end cap 62 either manually or automatically as described, the end 92 of spring 91 will first close the valve element 23 or 42 and then tear through the end thereof at the opening 32 or 49 whereby the bag may be discarded and replaced with a new one.

The end cap 62 is also provided with a seal 93 for sealing about the opening 27" which is brought into engagement with the sheet 21 or the valve element 42 when the bag is applied to the end cap 62 and is moved out of engagement therewith when the bag is removed from the end cap 62. The particular manner in which that is accomplished is fully described in my copending application Serial No. 402,719 filed January 7, 1954, and need not be specifically described herein.

From the foregoing it can be seen that the present invention provides a simple, discardable paper filter bag which of necessity must be replaced with a new one when a soiled bag is removed from the cleaner, which includes a combined mounting for the bag and a valve member which must be closed as the bag is removed from the cleaner and in which the bag may be simply applied and removed from the cleaner.

While I have shown and disclosed two alternative bag constructions and two alternative valve and bag mounting constructions, it is to be understood that those alternative constructions are to be taken as illustrative only and not in a limiting sense. I do not wish to be limited to the particular constructions shown and described but wish to include all equivalent variations thereof except as limited by the scope of the claims.

I claim:

1. In combination, a paper filter bag having a flat bottom, two opposed flat side walls interconnected by pleats and closed at its top, said bag being readily collapsible into a compact flat condition for shipment and storage, said bottom wall having an air inlet opening spaced inwardly from the perimeter of said bottom, a valve assembly comprising a mounting plate and a slide valve movable relative to one another so that a pair of openings therethrough can be moved into and out of registry with one another, means frictionally holding said plate and valve in preselected positions as desired, and means securing said valve assembly to the bottom of said filter bag with the opening in said mounting plate in registry with said filter bag inlet and with the opposite marginal edges of said mounting plate free of attachment to the bottom of the filter bag whereby said mounting plate and said filter bag may be supported from the side edges of said mounting plate.

2. In combination, a non-reuseable paper filter bag for use in a suction cleaner, said bag having an elongated main body and at least one substantially flat wall provided with an air inlet opening, a combined filter mounting and valve assembly for said filter bag, said assembly comprising a flat relatively stiff member having an inlet opening therethrough having its rim edges secured in an air-tight manner to the rim edges of said filter bag inlet opening, the opposite side edges of said stiff member being unattached to said filter bag and spaced inwardly of the adjacent perimeter edge of said filter bag and adapted to support said filter bag in a suction cleaner by suspension from said stiff member, and a slide valve carried by said assembly for closing said inlet opening when said bag is filled with dirt and ready for removal from a suction cleaner.

3. A disposable filter bag comprising an elongated bag of filtering material having a flat side provided with an inlet opening, a mounting plate of less area than said flat side having an inlet opening registering with the inlet opening of said bag and secured to said bag about the area adjacent said inlet opening with the side edges of said mounting plate free of attachment to said flat side of the bag to provide free extensions inwardly of the periphery of said flat side of said bag adapted to be received in a channelled support for mounting the bag on a suction cleaner, and a valve element slidably mounted on said mounting plate, said valve element having a body portion including an opening adapted to register with the inlet openings of said bag and mounting plate when in one position and an imperforate portion to close said inlet openings when said valve is moved to a second position, said mounting plate including means cooperating with the valve element body portion to guide the body portion in its movement from the one position to the second position, and means in the mounting plate cooperating with the valve element to limit the movement of the valve element to the second position aligning the imperforate portion with the inlet opening.

4. A disposable filter bag comprising an elongated bag of filtering material having a flat side provided with an inlet opening, a mounting plate having an inlet opening registering with the inlet opening of said bag and secured to the latter about the area adjacent said bag inlet opening, said mounting plate provided with side extensions free of said flat side wall, a pair of longitudinal slots formed in said extensions at one end of said plate adjacent the lateral edges thereof and a transverse slot formed in said extensions at the opposite end of said plate, a valve element having laterally projecting wings at one end thereof extending through said longitudinal slots to lie below said lateral free edges of said plate, the opposite end of said valve element extending through said transverse slot to lie below a free edge of said plate and having a body portion including an opening adapted to register with the inlet openings of said bag and mounting plate when in one position and an imperforate portion to close said inlet openings when said valve is moved to a second position, said mounting plate including means cooperating with the valve element body portion to guide the body portion in its movement from the one position to the second position, and means in the mounting plate cooperating with the valve element to limit the movement of the valve element to the second position aligning the imperforate portion with the inlet opening.

5. A combined mounting plate and valve for attaching a disposable filter bag to a suction cleaner comprising, a mounting plate for attachment to a filter bag having an inlet opening and having an inlet opening for alignment with the inlet opening of the filter bag, said mounting plate comprising a strip of stiff paper formed with longitudinally extending slots adjacent its lateral edges at one end of said plate and a transverse slot at its opposite end, a valve element slidably mounted on said mounting plate and having a body portion including an opening for alignment with the inlet opening of said mounting plate and being movable relative to said mounting plate to arrange said openings out of registry so as to close the inlet openings, said valve comprising a sheet of stiff paper formed with laterally extending wings at one end thereof and with a narrowed body portion extending to the other end thereof, said valve element being positioned on top of said mounting plate with said wings extending downwardly through said longitudinal slots and said narrowed body portion extending downwardly through said transverse slot, said mounting plate including means cooperating with the valve element body portion to guide the body portion, and means in the mounting plate cooperating with said wings to limit the movement of the valve element to locate said openings out of registry and closing the filter bag inlet opening with the body portion of the valve element.

6. A disposable filter bag comprising an elongated bag of filtering material having a flat side provided with an inlet opening, a mounting plate having an inlet opening registering with the inlet opening of said bag and secured to said bag about the area adjacent said inlet opening, said mounting plate comprising upper and lower sheets of stiff paper separated at their edges by a pair of parallel strips secured to said sheets to form a channel having parallel walls between them, said strips being narrowed at one end whereby said channel is wider at one end than the other, a valve element slidably mounted on said mounting plate, said valve element including a sheet of stiff paper having a body portion provided with an opening adapted to register with the inlet openings of said bag and mounting plate when in one position and an imperforate portion to close said inlet openings when said valve is moved to a second position, said sheet of stiff paper formed with laterally extending wings at one end thereof and with a narrowed body having parallel side walls extending to the other end thereof, said valve element being positioned in said channel with said narrowed body in the narrow portion of said channel and said wings positioned in the wide portion of said channel, and said mounting plate including means cooperating with the valve element body portion to guide the body portion in its movement from the one position to the second position, and means in the mounting plate cooperating with the valve element to limit the movement of the valve element to the second position aligning the imperforate portion with the inlet opening.

References Cited in the file of this patent

UNITED STATES PATENTS

| | | |
|---|---|---|
| 808,170 | Rogers | Dec. 26, 1905 |
| 2,070,674 | Muentener | Feb. 16, 1937 |
| 2,549,373 | Forsyth | Apr. 17, 1951 |
| 2,577,863 | Sosnowich | Dec. 11, 1951 |
| 2,590,235 | Cranmer | Mar. 25, 1952 |
| 2,618,411 | Flaherty | Nov. 18, 1952 |

FOREIGN PATENTS

| | | |
|---|---|---|
| 27,162 | Great Britain | Dec. 14, 1908 |